(12) United States Patent
Ivanov et al.

(10) Patent No.: US 10,877,797 B2
(45) Date of Patent: Dec. 29, 2020

(54) REMOTE OPERATION AUTHORIZATION BETWEEN PAIRS OF SITES WITH PRE-ESTABLISHED TRUST

(71) Applicant: VMware, Inc., Palo Alto, CA (US)

(72) Inventors: Dobrin Slavov Ivanov, Sofia (BG); Kalin Georgiev Fetvadjiev, Sofia (BG)

(73) Assignee: VMware, Inc., Palo Alto, CA (US)

( * ) Notice: Subject to any disclaimer, the term of this patent is extended or adjusted under 35 U.S.C. 154(b) by 119 days.

(21) Appl. No.: 15/853,279

(22) Filed: Dec. 22, 2017

(65) Prior Publication Data

US 2018/0181434 A1 Jun. 28, 2018

Related U.S. Application Data

(60) Provisional application No. 62/438,165, filed on Dec. 22, 2016.

(51) Int. Cl.
*G06F 9/48* (2006.01)
*G06F 9/455* (2018.01)
*H04L 12/46* (2006.01)
*G06F 9/50* (2006.01)

(52) U.S. Cl.
CPC ........ *G06F 9/4856* (2013.01); *G06F 9/45558* (2013.01); *G06F 9/5077* (2013.01); *H04L 12/4641* (2013.01); *G06F 9/5027* (2013.01); *G06F 2009/4557* (2013.01)

(58) Field of Classification Search
CPC ........ G06F 2009/4557; G06F 9/45558; G06F 9/4856; G06F 9/5027; G06F 9/5077
See application file for complete search history.

(56) References Cited

U.S. PATENT DOCUMENTS

| | | | |
|---|---|---|---|
| 9,699,114 B1 * | 7/2017 | Hintermeister | H04L 47/805 |
| 10,083,061 B2 * | 9/2018 | Odenheimer | G06F 9/4843 |
| 2012/0185913 A1 * | 7/2012 | Martinez | G06F 9/455 726/1 |
| 2013/0152076 A1 * | 6/2013 | Patel | G06F 9/45558 718/1 |
| 2013/0198739 A1 * | 8/2013 | Razdan | G06F 9/45558 718/1 |
| 2014/0137244 A1 * | 5/2014 | Banerjee | G06F 21/52 726/22 |

* cited by examiner

*Primary Examiner* — Jorge A Chu Joy-Davila
(74) *Attorney, Agent, or Firm* — Patterson + Sheridan, LLP

(57) ABSTRACT

One or more embodiments provide techniques for executing a workflow in a private data center. The cloud data center receives a request from a user. The cloud data center notifies the private data center that the request necessitates execution of the workflow in the private data center. A handler in the private data center maps a component of the cloud data center to the request. The handler determines whether a pairing exists between the component in the cloud data center and a component of the private data center. Upon determining that the pairing exists, the handler executes the workflow in the private data center. The handler publishes the results of the workflow to the cloud data center.

17 Claims, 3 Drawing Sheets

REMOTE OPERATION AUTHORIZATION BETWEEN PAIRS OF SITES WITH PRE-ESTABLISHED TRUST

CROSS-REFERENCE TO RELATED APPLICATIONS

This application claims priority to U.S. Provisional Patent Application Ser. No. 62/438,165, filed Dec. 22, 2016, which is incorporated by reference herein in its entirety.

BACKGROUND

Cloud architectures are used in cloud computing and cloud storage systems for offering infrastructure-as-a-service (IaaS) cloud services. Examples of cloud architectures include the VMware vCloud Director® cloud architecture software, Amazon EC2™ web service, and OpenStack™ open source cloud computing service. IaaS cloud service is a type of cloud service that provides access to physical and/or virtual resources in a cloud environment. These services provide a tenant application programming interface (API) that supports operations for manipulating IaaS constructs, such as virtual machines (VMs) and logical networks.

A hybrid cloud system aggregates the resource capability from both private and public clouds. A private cloud can include one or more customer data centers (referred to herein as "private data centers"). The public cloud can include a multi-tenant cloud architecture providing IaaS cloud services.

SUMMARY

One or more embodiments provide techniques for executing a workflow in a private data center. The cloud data center receives a request from a user. The cloud data center notifies the private data center that the request necessitates execution of the workflow in the private data center. A handler in the private data center maps a component of the cloud data center to the request. The handler determines whether a pairing exists between the component in the cloud data center and a component of the private data center. Upon determining that the pairing exists, the handler executes the workflow in the private data center. The handler publishes the results of the workflow to the cloud data center.

Further embodiments include a non-transitory computer-readable storage medium comprising instructions that cause a computer system to carry out the above method, as well as a computer system configured to carry out the above method.

BRIEF DESCRIPTION OF THE DRAWINGS

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1:
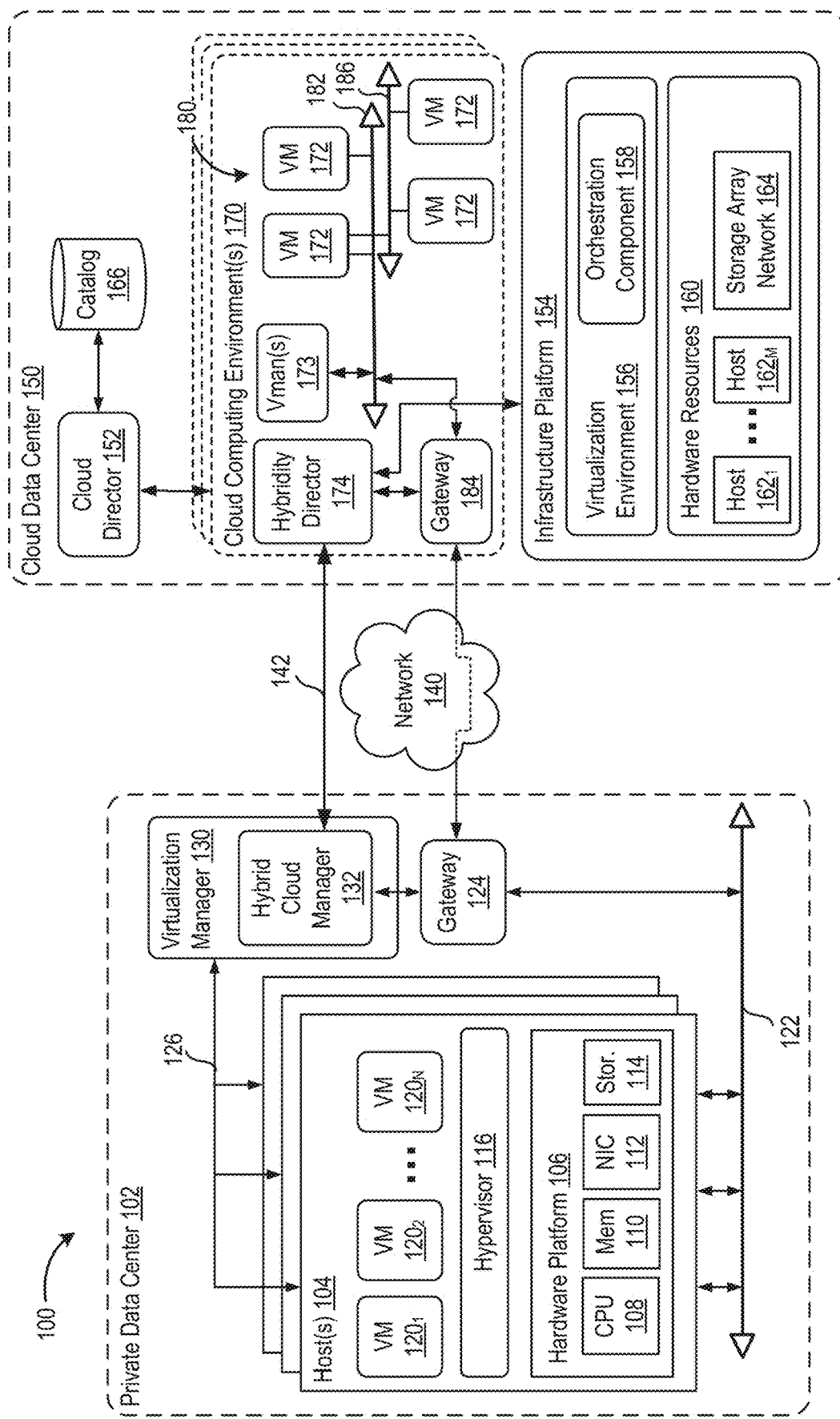
FIG. 1 is a block diagram of a hybrid cloud computing system, according to one embodiment disclosed herein.

FIG. 1 is a block diagram of a hybrid cloud computing system 100 in which one or more embodiments of the present disclosure may be utilized. Hybrid cloud computing system 100 includes a virtualized computing system implementing a private data center 102 and a virtualized computing system implementing a cloud data center 150. Hybrid cloud computing system 100 is configured to provide a common platform for managing and executing virtual workloads seamlessly between private data center 102 and cloud data center 150. In one embodiment, private data center 102 may be a data center controlled and administrated by a particular enterprise or business organization, while cloud data center 150 may be operated by a cloud computing service provider and exposed as a service available to account holders, such as the particular enterprise in addition to other enterprises. As such, private data center 102 may sometimes be referred to as a "private" cloud, and cloud data center 150 may be referred to as a "public" cloud.

As used herein, an internal cloud or "private" cloud is a cloud in which a tenant and a cloud service provider are part of the same organization, while an external or "public" cloud is a cloud that is provided by an organization that is separate from a tenant that accesses the external cloud. For example, the tenant may be part of an enterprise, and the external cloud may be part of a cloud service provider that is separate from the enterprise of the tenant and that provides cloud services to different enterprises and/or individuals. In embodiments disclosed herein, a hybrid cloud is a cloud architecture in which a tenant is provided with seamless access to both private cloud resources and public cloud resources.

Private data center 102 includes one or more host computer systems ("hosts 104"). Hosts 104 may be constructed on a server grade hardware platform 106, such as an x86 architecture platform. As shown, hardware platform 106 of each host 104 may include conventional components of a computing device, such as one or more processors (CPUs) 108, system memory 110, a network interface 112, storage system 114, and other I/O devices such as, for example, a mouse and keyboard (not shown). CPU 108 is configured to execute instructions, for example, executable instructions that perform one or more operations described herein and may be stored in memory 110 and in local storage. Memory 110 is a device allowing information, such as executable instructions, cryptographic keys, virtual disks, configurations, and other data, to be stored and retrieved. Memory 110 may include, for example, one or more random access memory (RAM) modules. Network interface 112 enables host 104 to communicate with another device via a communication medium, such as a network 122 within private data center 102. Network interface 112 may be one or more network adapters, also referred to as a Network Interface Card (NIC). Storage system 114 represents local storage devices (e.g., one or more hard disks, flash memory modules, solid state disks, and optical disks) and/or a storage interface that enables host 104 to communicate with one or more network data storage systems. Examples of a storage interface are a host bus adapter (HBA) that couples host 104 to one or more storage arrays, such as a storage area network (SAN) or a network-attached storage (NAS), as well as other network data storage systems.

Each host 104 is configured to provide a virtualization layer that abstracts processor, memory, storage, and networking resources of hardware platform 106 into multiple virtual machines $120_1$ to $120_N$ (collectively referred to as VMs 120) that run concurrently on the same hosts. VMs 120 run on top of a software interface layer, referred to herein as a hypervisor 116, that enables sharing of the hardware resources of host 104 by VMs 120. One example of hypervisor 116 that may be used in an embodiment described herein is a VMware ESXi™ hypervisor provided as part of the VMware vSphere® solution made commercially available from VMware, Inc. of Palo Alto, Calif. Hypervisor 116 may run on top of the operating system of host 104 or directly on hardware components of host 104.

Private data center 102 includes a virtualization management component (depicted in FIG. 1 as virtualization manager 130) that may communicate to the plurality of hosts 104 via a network, sometimes referred to as a management network 126. In one embodiment, virtualization manager 130 is a computer program that resides and executes in a central server, which may reside in private data center 102, or alternatively, running as a VM in one of hosts 104. One example of a virtualization manager is the vCenter Server™ product made available from VMware, Inc. Virtualization manager 130 is configured to carry out administrative tasks for computing system 102, including managing hosts 104, managing VMs 120 running within each host 104, provisioning VMs, migrating VMs from one host to another host, and load balancing between hosts 104.

In one embodiment, virtualization manager 130 includes a hybrid cloud management module (depicted as hybrid cloud manager 132) configured to manage and integrate virtualized computing resources provided by cloud data center 150 with virtualized computing resources of computing system 102 to form a unified "hybrid" computing platform. Hybrid cloud manager 132 is configured to deploy VMs in cloud data center 150, transfer VMs from virtualized computing system 102 to cloud data center 150, and perform other "cross-cloud" administrative tasks, as described in greater detail later. In one implementation, hybrid cloud manager 132 is a module or plug-in complement to virtualization manager 130, although other implementations may be used, such as a separate computer program executing in a central server or running in a VM in one of hosts 104. One example of hybrid cloud manager 132 is the VMware vCloud Connector® product made available from VMware, Inc.

In one embodiment, hybrid cloud manager 132 is configured to control network traffic into network 122 via a gateway component (depicted as a gateway 124). Gateway 124 (e.g., executing as a virtual appliance) is configured to provide VMs 120 and other components in private data center 102 with connectivity to an external network 140 (e.g., Internet). Gateway 124 may manage external public IP addresses for VMs 120 and route traffic incoming to and outgoing from private data center 102 and provide networking services, such as firewalls, network address translation (NAT), dynamic host configuration protocol (DHCP), load balancing, and virtual private network (VPN) connectivity over a network 140.

In one or more embodiments, cloud data center 150 is configured to dynamically provide an enterprise (or users of an enterprise) with one or more virtual data centers 170 in which a user may provision VMs 120, deploy multi-tier applications on VMs 120, and/or execute workloads. Cloud data center 150 includes an infrastructure platform 154 upon which a cloud computing environment 170 may be executed. In the particular embodiment of FIG. 1, infrastructure platform 154 includes hardware resources 160 having computing resources (e.g., hosts $162_1$ to $162_N$), storage resources (e.g., one or more storage array systems, such as SAN 164), and networking resources, which are configured in a manner to provide a virtualization environment 156 that supports the execution of a plurality of virtual machines 172 across hosts 162. It is recognized that hardware resources 160 of cloud data center 150 may in fact be distributed across multiple data centers in different locations.

Each cloud computing environment 170 is associated with a particular tenant of cloud data center 150, such as the enterprise providing virtualized computing system 102. In one embodiment, cloud computing environment 170 may be configured as a dedicated cloud service for a single tenant comprised of dedicated hardware resources 160 (i.e., physically isolated from hardware resources used by other users of cloud data center 150). In other embodiments, cloud computing environment 170 may be configured as part of a multi-tenant cloud service with logically isolated virtualized computing resources on a shared physical infrastructure. As shown in FIG. 1, cloud data center 150 may support multiple cloud computing environments 170, available to multiple enterprises in single-tenant and multi-tenant configurations.

In one embodiment, virtualization environment 156 includes an orchestration component 158 (e.g., implemented as a process running in a VM) that provides infrastructure resources to cloud computing environment 170 responsive to provisioning requests. For example, if an enterprise required a specified number of virtual machines to deploy a web application or to modify (e.g., scale) a currently running web application to support peak demands, orchestration component 158 can initiate and manage the instantiation of virtual machines (e.g., VMs 172) on hosts 162 to support such requests. In one embodiment, orchestration component 158 instantiates virtual machines according to a requested template that defines one or more virtual machines having specified virtual computing resources (e.g., compute, networking, storage resources). Further, orchestration component 158 monitors the infrastructure resource consumption levels and requirements of cloud computing environment 170 and provides additional infrastructure resources to cloud computing environment 170 as needed or desired. In one example, similar to private data center 102, virtualization environment 156 may be implemented by running on hosts 162 VMware ESXi™-based hypervisor technologies provided by VMware, Inc. (although it should be recognized that any other virtualization technologies, including Xen® and Microsoft Hyper-V® virtualization technologies may be utilized consistent with the teachings herein).

In one embodiment, cloud data center 150 may include a cloud director 152 (e.g., run in one or more virtual machines) that manages allocation of virtual computing resources to an enterprise for deploying applications. Cloud director 152 may be accessible to users via a REST (Representational State Transfer) API (Application Programming Interface) or any other client-server communication protocol. Cloud director 152 may authenticate connection attempts from the enterprise using credentials issued by the cloud computing provider. Cloud director 152 maintains and publishes a catalog 166 of available virtual machine templates and packaged virtual machine applications that represent virtual machines that may be provisioned in cloud computing environment 170. A virtual machine template is a virtual machine image that is loaded with a pre-installed guest operating system, applications, and data, and is typically used to repeatedly create a VM having the pre-defined configuration. A packaged virtual machine application is a logical container of pre-configured virtual machines having software components and parameters that define operational details of the packaged application. An example of a packaged VM application is vApp technology made available by VMware, Inc., although other technologies may be utilized. Cloud director 152 receives provisioning requests submitted (e.g., via REST API calls) and may propagates such requests to orchestration component 158 to instantiate the requested virtual machines (e.g., VMs 172). One example of cloud director 152 is the VMware vCloud Director® produced by VMware, Inc.

In the embodiment of FIG. 1, cloud computing environment 170 supports the creation of a virtual data center 180 having a plurality of virtual machines 172 instantiated to, for example, host deployed multi-tier applications, as well as one or more virtualization managers 173 (abbreviated as "Vman(s)"). A virtual data center 180 is a logical construct that provides compute, network, and storage resources to an organization. Virtual data centers 180 provide an environment where VM 172 can be created, stored, and operated, enabling complete abstraction between the consumption of infrastructure service and underlying resources. VMs 172 may be configured similarly to VMs 120, as abstractions of processor, memory, storage, and networking resources of hardware resources 160. Virtualization managers 173 can be configured similarly to virtualization manager 130.

Virtual data center 180 includes one or more virtual networks 182 used to communicate between VMs 172 and managed by at least one networking gateway component (e.g., gateway 184), as well as one or more isolated internal networks 186 not connected to gateway 184. Gateway 184 (e.g., executing as a virtual appliance) is configured to provide VMs 172 and other components in cloud computing environment 170 with connectivity to external network 140 (e.g., Internet). Gateway 184 manages external public IP addresses for virtual data center 180 and one or more private internal networks interconnecting VMs 172. Gateway 184 is configured to route traffic incoming to and outgoing from virtual data center 180 and provide networking services, such as firewalls, network address translation (NAT), dynamic host configuration protocol (DHCP), and load balancing. Gateway 184 may be configured to provide virtual private network (VPN) connectivity over a network 140 with another VPN endpoint, such as a gateway 124 within private data center 102. In other embodiments, gateway 184 may be configured to connect to communicate with private data center 102 using a high-throughput, dedicated link (depicted as a direct connect 142) between private data center 102 and cloud data center 150. In one or more embodiments, gateways 124 and 184 are configured to provide a "stretched" layer-2 (L2) network that spans private data center 102 and virtual data center 180, as shown in FIG. 1.

While FIG. 1 depicts a single connection between private gateway 124 and cloud-side gateway 184 for illustration purposes, it should be recognized that multiple connections between multiple private gateways 124 and cloud-side gateways 184 may be used. Furthermore, while FIG. 1 depicts a single instance of a gateway 184, it is recognized that gateway 184 may represent multiple gateway components within cloud data center 150. In some embodiments, a separate gateway 184 may be deployed for each virtual data center, or alternatively, for each tenant. In some embodiments, a gateway instance may be deployed that manages traffic with a specific tenant, while a separate gateway instance manages public-facing traffic to the Internet. In yet other embodiments, one or more gateway instances that are shared among all the tenants of cloud data center 150 may be used to manage all public-facing traffic incoming and outgoing from cloud data center 150.

In one embodiment, each virtual data center 180 includes a "hybridity" director module (depicted as hybridity director 174) configured to communicate with the corresponding hybrid cloud manager 132 in private data center 102 to enable a common virtualized computing platform between private data center 102 and cloud data center 150. Hybridity director 174 (e.g., executing as a virtual appliance) may communicate with hybrid cloud manager 132 using Internet-based traffic via a VPN tunnel established between gateways 124 and 184, or alternatively, using direct connection 142. In one embodiment, hybridity director 174 may control gateway 184 to control network traffic into virtual data center 180. In some embodiments, hybridity director 174 may control VMs 172 and hosts 162 of cloud data center 150 via infrastructure platform 154.

Figure 2:
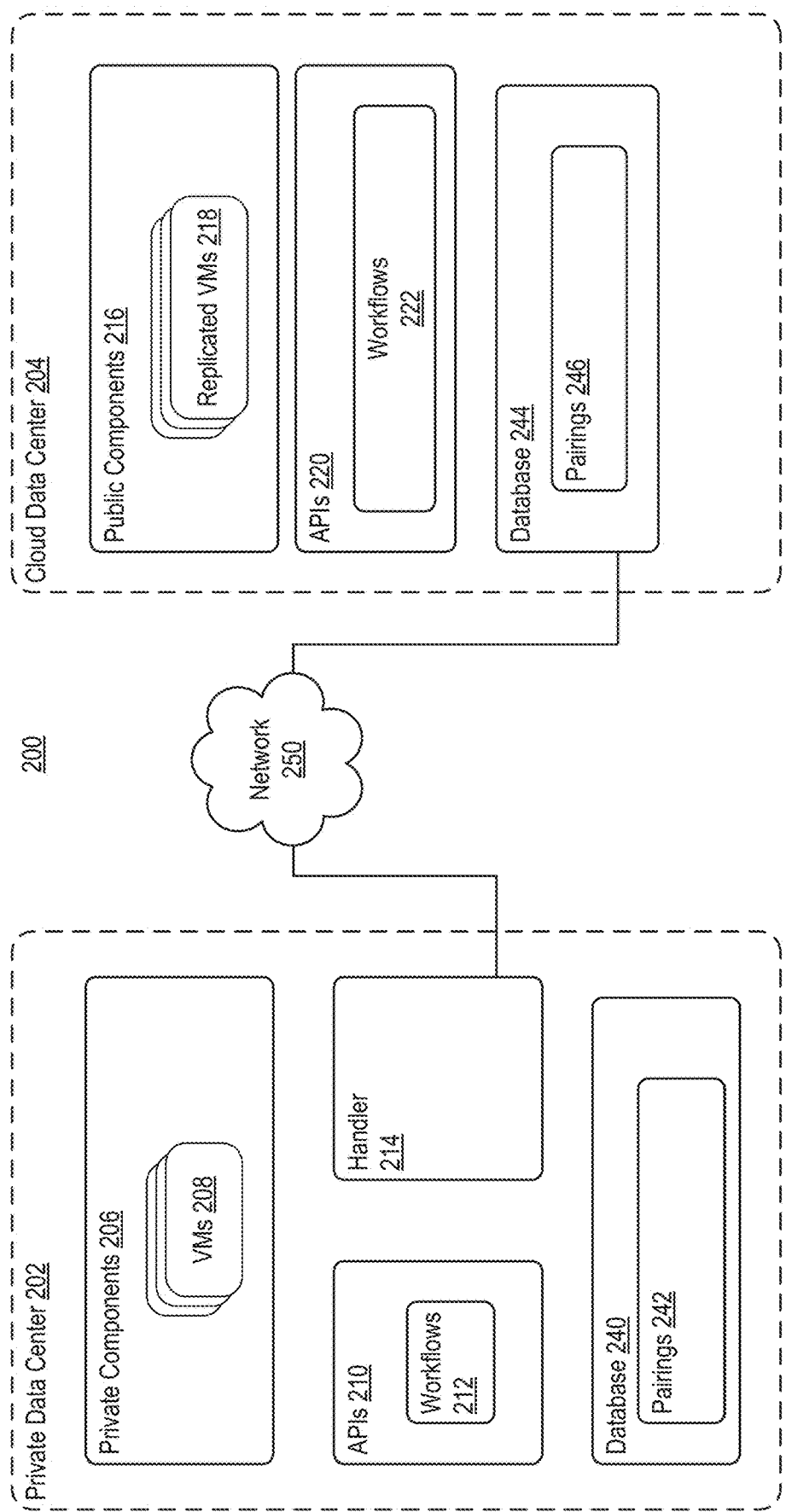
FIG. 2 is a logical diagram of the hybrid cloud computing system of FIG. 1, according to one embodiment disclosed herein.

FIG. 2 is a logical diagram of a hybrid cloud computing system 200, according to one embodiment. Hybrid cloud computing system 200 includes a private data center 202 and cloud data center 204. Private data center 202 may include private component(s) 206. For example, private components 206 may be VMs, virtual networks, and the like. Private component(s) 206 may be implemented using one or more hosts. Each host may be configured to provide a virtualization layer that abstracts processor, memory, storage, and networking resources of a hardware platform (e.g., hardware platform 156) into multiple virtual machines that run concurrently on the same host. In the example shown, private component(s) 206 include one or more VMs 208.

Cloud data center 204 may be operated by a cloud computing service provider and exposed as a service available to account holders, such as the particular enterprise in addition to other enterprises. Cloud data center 204 may include public component(s) 216. Public components 216 may include replicated VM(s) 218. A replicated VM is, generally, a copy of an original VM. For example, each of the replicated VMs 218 corresponds to one of the VMs 208 of private data center 202. Replicating VMs 208 of private data center 202 is a data protection strategy in which each of VMs 208 is replicated to provide some measure of redundancy. Replication may be used for many purposes, such as ensuring data availability upon storage failures, site disasters, planned maintenance, or the like.

Private data center 202 further includes a database 240 having pairing(s) 242. Each pairing 242 represents a trust that is established between private data center 202 and cloud data center 204 over the network. Cloud data center 204 further includes a database 244 having pairings(s) 246. Each pairing 246 corresponds to a pairing 242 in database 240. For example, a user having administration accounts at both private data center 202 and cloud data center 204 can initiate a pairing request between public component(s) 216 and private component(s) 206, thus establishing a pairing therebetween. Once the user pairs private data center 202 and cloud data center 204, each site can authenticate to the other and maintain a persistent administrative connection therebetween.

Pairings 242, 246 allow for trust to be established between cloud data center 204 and private data center 202 without exposing the unpaired infrastructure of private data center 202 (i.e., private components 206) through a public IP, VPN, or tunnel-based solutions to public components 216 running in cloud data center 204. For example, only previously established trusted pairs between private data center 202 and cloud data center 204 can communicate over network 250. In one embodiment, pairings 242, 246 may result in a persistent connection between designated private components 206 and public components 216 in each pairing 242, 246. In other embodiments, a pairing 242, 246 may be established only when cloud data center 204 requests to communicate with private data center 202, or vice versa.

Referring to private data center 202, private data center 202 includes a handler 214. Handler 214 is configured to access database 244 of cloud data center 204 to process event requests. In some embodiments, handler 214 may continuously poll database 244 to determine whether there are any pairings 246 contained therein as a result of an event request. In another embodiment, handler 214 may periodically poll database 244 at pre-set times to determine whether there are any pairings 246 contained therein as a result of an event request.

In other embodiments, cloud data center 204 may send a notification to handler 214 over network 250 that a request has been received, and that workflows 212 in private data center 202 need to be executed. For example, cloud data center 204 may include a set of APIs 220 having workflow(s) 222. A workflow 222 is a series of actions and decisions to be executed in connection with VMs 218. Each workflow 222 includes various phases for managing VMs (e.g., allocation phase, provisioning phase, etc.). In a specific example, a workflow 222 can include an allocation phase and APIs 220 may include a given subset of APIs corresponding to the allocation phase. In some embodiments, cloud data center 204 may receive a request that necessitates workflows to be performed in private data center 202. As such, cloud data center 204 may communicate with private data center 202 over network 250 via handler 214 to request a workflow to be performed in private data center 202. Handler 214 checks if there is a pairing between private components 206 and public components 216 such that a secure connection may be formed. If handler 214 determines there is a pairing between private components 206 and public components 216, then handler 214 establishes a secure connection between private components 206 and public components 216 associated with a pairing 242, 246.

Private data center 202 may further include a set of APIs 210 having workflow(s) 212. Once handler 214 establishes a secure connection between private data center 202 and cloud data center 204 via a pairing 242, 218, handler 214 may being execution of workflow(s) 212 in accordance with the user's request.

Figure 3:
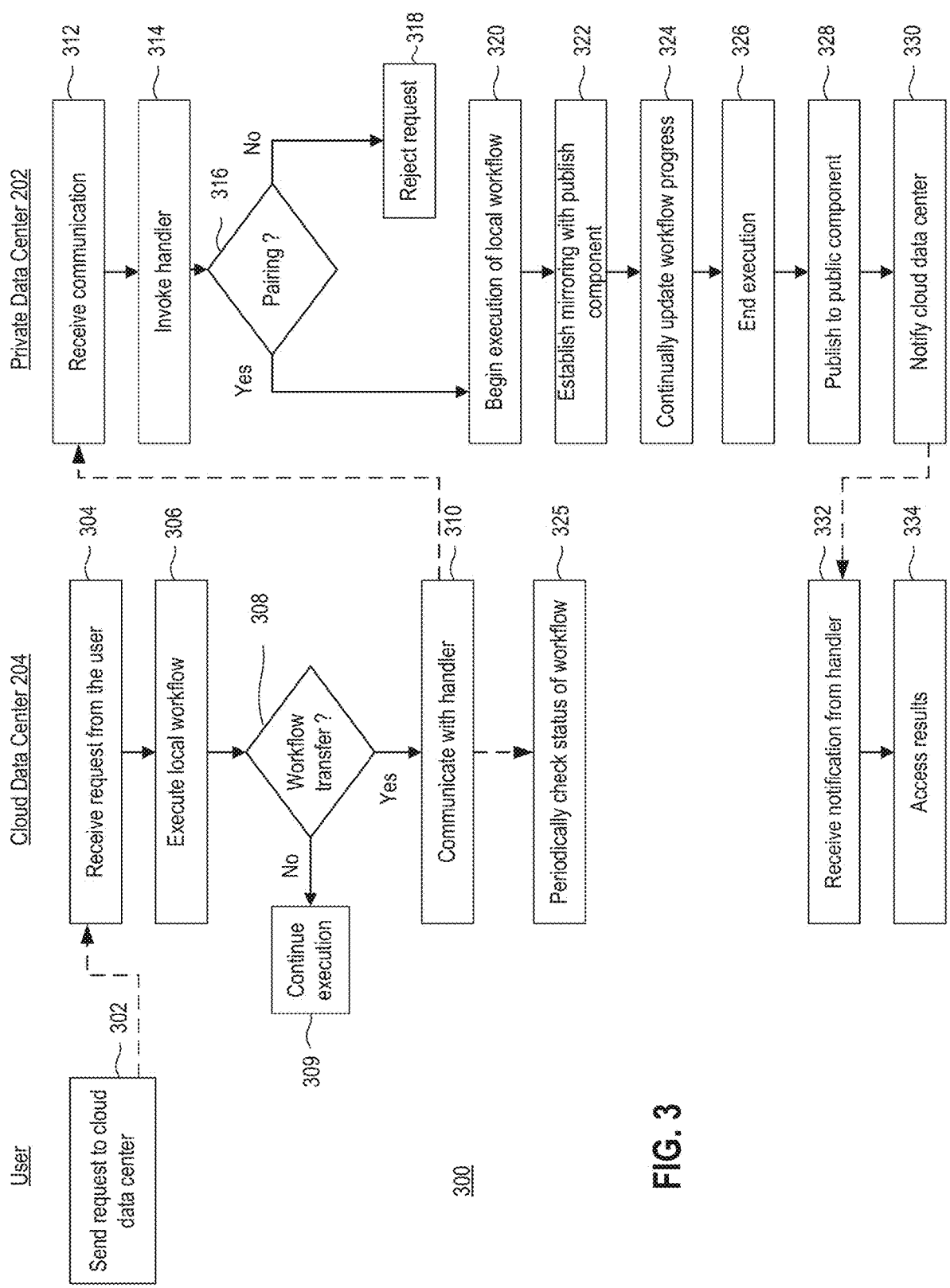
FIG. 3 is a flow diagram illustrating a method of executing a workflow in a private data center with restricted network access, according to one embodiment disclosed herein.

FIG. 3 is a flowchart illustrating a method 300 of executing and tracking workflows in a private data center with restricted network access, according to one embodiment. At step 302, a user of a public cloud transmits a request to cloud data center 204. For example, the user may transmit a request to cloud data center 204 to begin a disaster recovery process. The user may optionally transmit pairing information to the cloud data center for the event. For example, the user may transmit to cloud data center 204, a pairing between a public component 216 and a private component 206 associated with the request.

At step 304, cloud data center 204 receives at least the event request from the user. In some embodiments, cloud data center 204 will also receive pairing information along with the event request. Cloud data center 204 then executes a local workflow associated with the request (step 306). For example, the request may be a disaster recovery event in response to a replicated VM 218 acting abnormally. Cloud data center 204 then determines whether the request has to be transferred from cloud data center 204 to private data center 202 for continued execution (step 308). For example, in a disaster recovery process, a VM 208 corresponding to a replicated VM 218 may need to be shut down. To do so, control must be transferred from cloud data center 204 to private data center 202. If the request necessitates execution of the workflow in private data center 202, cloud data center 204 communicates with private data center 202 (step 310). For example, in one embodiment, cloud data center 204 may send a message to private data center 202. In other embodiments, private data center 202 may continually poll cloud data center looking for pairings 246 that formed as a result of a request. If the request does not necessitate execution in private data center 202, then at step 309 cloud data center 204 continues execution therein.

At step 312, private data center 202 receives the communication from cloud data center 204. In one embodiment, private data center 202 receives the communication via handler 214. At step 314, private data center 202 invoked handler 214. Handler 214 determines whether a pairing exists between a public component 216 associated with the request and a private component 206 associated with public component 216 (step 316). In one embodiment, such a pairing may be predefined by a user with administrative accounts at both private data center 202 and cloud data center 204. In another embodiment, such a pairing may be requested by the user when the user sends a request to cloud data center 202 in step 302. To determine whether a pairing exists, handler 214 accesses database 240 storing pairing(s) 242. Pairings(s) 242 correspond to pairing(s) 246 stored in database 244 in cloud data center 204. Pairings 242, 246 allow for trust to be established between cloud data center 204 and private data center 202 on a limited basis. For example, assuming a pairing exists between VM 208_1 and VM 218₁, such pairing does not expose VM 218₁ to any other private component 206 other than VM 208₁. As such, pairings 242, 246 do not expose the infrastructure of private data center 202 through a public IP, VPN, or tunnel-based solutions to public components 216 running in cloud data center 204 provided that a pairing does not exist.

If a pairing does not exist, handler 214 rejects the request (step 318). If a pairing does exist, then handler begins execution of a local workflow (step 320). For example, handler 214 executes workflows 212 in VM 208 corresponding to replicated VM 218 in cloud data center 204 for which the disaster recovery process is being performed.

In some embodiments, at step 322 handler 214 establishes a mirroring between private data center 202 and cloud data center 204. For example, handler 214 may establish a mirroring between private component 206 and public component 216 as set forth in the pairing corresponding to the request. At step 324, handler 214 updates progress of execution of the workflow in VM 208. For example, handler 214 updates the progress of execution of the workflow in VM 208 via replicated VM 218 associated with VM 208. At step 325, cloud data center 204 may access the updates via replicated VM 218. At step 326, handler 214 ends execution once the workflow has been complete.

Handler 214 then publishes that execution has ended to replicated VM 218 (step 328). For example, handler 214 publishes that execution has ended to replicated VM 218 corresponding to VM 208 associated with the request. Handler 214 then notifies cloud data center 204 that the workflow has stopped executing (step 330). Cloud data center 204 receives the notification from handler 214 (step 332). For example, cloud data center 204 accesses the endpoint associated with the event in replicated VM 218. Cloud data center 204 may then access the results of the execution (step 334).

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application runs. It should be noted that these embodiments may also apply to other examples of contexts, such as containers not including a guest operating system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in userspace on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O. The term "virtualized computing instance" as used herein is meant to encompass both VMs and OS-less containers.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

We claim:

1. A method of workflow execution in a private data center, comprising:
    receiving a request from a user at a cloud data center, the request associated with a component in the cloud data center;
    executing, at the cloud data center, a workflow associated with the component in the cloud data center to handle the request;

determining, at the cloud data center, that the request necessitates a transfer of the workflow to the private data center for continued execution;

notifying the private data center, via the cloud data center, that the request necessitates the transfer of the workflow;

determining, by a private data center handler accessing pairing information stored at the private data center, whether a pairing exists between the component of the cloud data center and a component of the private data center;

upon determining that the pairing exists, establishing a secure connection between the cloud data center and the private data center, transferring control of the workflow execution to the private data center via the secure connection, and executing the workflow in the private data center; and publishing, by the private data center handler, results of the workflow execution to the cloud data center.

2. The method of claim 1, wherein determining whether the pairing exists between the component of the cloud data center and the component of the private data center, comprises:

establishing a secure connection between the private data center and the cloud data center over a network without exposing the component of the cloud data center to one or more components outside of the pairing.

3. The method of claim 1, wherein determining whether the pairing exists between the component of the cloud data center and the component of the private data center, comprises:

accessing a database in the private data center storing one or more pairings as defined by a user having administrative accounts on both the private data center and the cloud data center.

4. The method of claim 1, wherein determining whether the pairing exists between the component of the cloud data center and the component of the private data center, comprises:

accessing a database in the cloud data center storing one or more pairings, wherein each of the one or more pairings are created upon receipt of the request.

5. The method of claim 1, wherein determining whether the pairing exists between the component of the cloud data center and the component of the private data center comprises:

determining whether there exists a virtual machine in the private data center that corresponds to a replicated virtual machine in the cloud data center.

6. The method of claim 1, upon determining that the pairing exists, executing the workflow in the private data center, comprises:

accessing one or more APIs associated with the workflow.

7. A computer system, comprising:
a processor; and
a memory storing program code, which, when executed on the processor, performs a method of workflow execution in a private data center, comprising:

receiving a request from a user at a cloud data center, the request associated with a component in the cloud data center;

executing, at the cloud data center, a workflow associated with the component in the cloud data center to handle the request;

determining, at the cloud data center, that the request necessitates a transfer of the workflow to the private data center for continued execution;

notifying the private data center, via the cloud data center, that the request necessitates the transfer of the workflow;

determining, by a private data center handler accessing pairing information stored at the private data center, whether a pairing exists between the component of the cloud data center and a component of the private data center;

upon determining that the pairing exists, establishing a secure connection between the cloud data center and the private data center, transferring control of the workflow execution to the private data center via the secure connection, and executing the workflow in the private data center; and publishing, by the private data center handler, results of the workflow execution to the cloud data center.

8. The computer system of claim 7, wherein determining whether the pairing exists between the component of the cloud data center and the component of the private data center, comprises:

establishing a secure connection between the private data center and the cloud data center over a network without exposing the component of the cloud data center to one or more components outside of the pairing.

9. The computer system of claim 7, wherein determining whether the pairing exists between the component of the cloud data center and the component of the private data center, comprises:

accessing a database in the private data center storing one or more pairings as defined by a user having administrative accounts on both the private data center and the cloud data center.

10. The computer system of claim 7, wherein determining whether the pairing exists between the component of the cloud data center and the component of the private data center, comprises:

accessing a database in the cloud data center storing one or more pairings, wherein each of the one or more pairings are created upon receipt of the request.

11. The computer system of claim 7, wherein determining whether the pairing exists between the component of the cloud data center and the component of the private data center comprises:

determining whether there exists a virtual machine in the private data center that corresponds to a replicated virtual machine in the cloud data center.

12. The computer system of claim 7, upon determining that the pairing exists, executing the workflow in the private data center, comprises:

accessing one or more APIs associated with the workflow.

13. A non-transitory computer readable medium comprising instructions, which when executed in a computer system, causes the computer system to carry out a method of workflow execution in a private data center, comprising:

receiving a request from a user at a cloud data center, the request associated with a component in the cloud data center;

executing, at the cloud data center, a workflow associated with the component in the cloud data center to handle the request;

determining, at the cloud data center, that the request necessitates a transfer of the workflow to the private data center for continued execution;

notifying the private data center, via the cloud data center, that the request necessitates the transfer of the workflow;

determining, by a private data center handler accessing pairing information stored at the private data center, whether a pairing exists between the component of the cloud data center and a component of the private data center;

upon determining that the pairing exists, establishing a secure connection between the cloud data center and the private data center, transferring control of the workflow execution to the private data center via the secure connection, and executing the workflow in the private data center; and publishing, by the private data center handler, results of the workflow to the cloud data center.

14. The non-transitory computer readable medium of claim 13, wherein determining whether the pairing exists between the component of the cloud data center and the component of the private data center, comprises:

establishing a secure connection between the private data center and the cloud data center over a network without exposing the component of the cloud data center to one or more components outside of the pairing.

15. The non-transitory computer readable medium of claim 13, wherein determining whether the pairing exists between the component of the cloud data center and the component of the private data center, comprises:

accessing a database in the private data center storing one or more pairings as defined by a user having administrative accounts on both the private data center and the cloud data center.

16. The non-transitory computer readable medium of claim 13, wherein determining whether the pairing exists between the component of the cloud data center and the component of the private data center, comprises:

accessing a database in the cloud data center storing one or more pairings, wherein each of the one or more pairings are created upon receipt of the request.

17. The non-transitory computer readable medium of claim 13, wherein determining whether the pairing exists between the component of the cloud data center and the component of the private data center comprises:

determining whether there exists a virtual machine in the private data center that corresponds to a replicated virtual machine in the cloud data center.

\* \* \* \* \*